No. 627,619. Patented June 27, 1899.
A. LECOMTE & I. LOESER.
AUTOMATIC PRESSURE REGULATOR FOR GAS DISTRIBUTING APPARATUS.
(Application filed Dec. 5, 1898.)
(No Model.)

Witnesses
George M. Richards
G. H. Walmsley

Inventors
Auguste Lecomte
Isidore Loeser
by W. H. Babcock
Atty

UNITED STATES PATENT OFFICE.

AUGUSTE LECOMTE AND ISIDORE LOESER, OF PARIS, FRANCE.

AUTOMATIC PRESSURE-REGULATOR FOR GAS-DISTRIBUTING APPARATUS.

SPECIFICATION forming part of Letters Patent No. 627,619, dated June 27, 1899.

Application filed December 5, 1898. Serial No. 698,293. (No model.)

*To all whom it may concern:*

Be it known that we, AUGUSTE LECOMTE and ISIDORE LOESER, citizens of the Republic of France, residing at Paris, France, have invented certain new and useful Improvements in Automatic Exhaust-Distributers for Candelabra, of which the following is a specification.

The object of the present invention is to provide an apparatus utilizing the direct power of water to increase or raise the pressure of illuminating-gas above that at which the said gas is distributed in the pipes of the town, or again for sucking in and driving or forcing back under slight pressure any description of fluid—such, for example, as air.

The apparatus, which will be hereinafter described, possesses a certain resemblance to water-injectors; but instead of operating by drawing, (or impulse,) as is the case in those apparatus, our exhauster operates for the compression of the gas by the creation of a regular homogeneous or solid liquid piston, which is renewed without interruption and which forces the fluid to be compressed into a divergent or extension which forms the pump-body. To this novel feature is added an arrangement for regulation and for safety called an "automatic distributer," which is of very great efficiency and the mode of operation of which is absolutely new.

By way of example and in order to properly describe our invention we have illustrated an exhauster in section and the various modifications thereof in Figures 1, 2, 3, 4, and 5 of the hereunto-annexed drawings.

Figure 1:
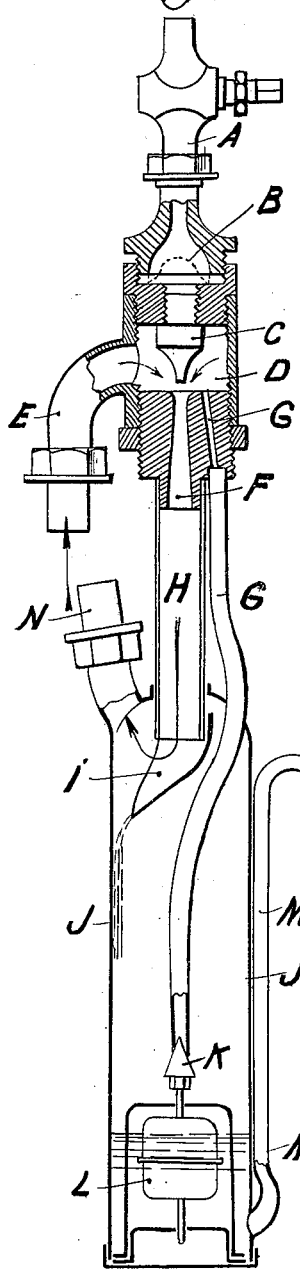
Figure 2:
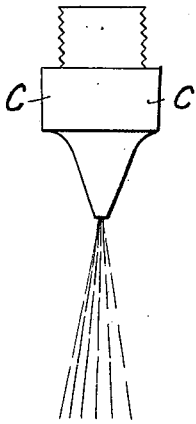
Figure 3:
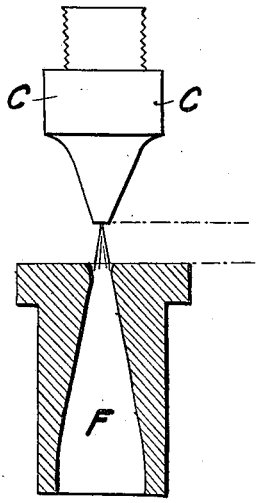
Figure 4:
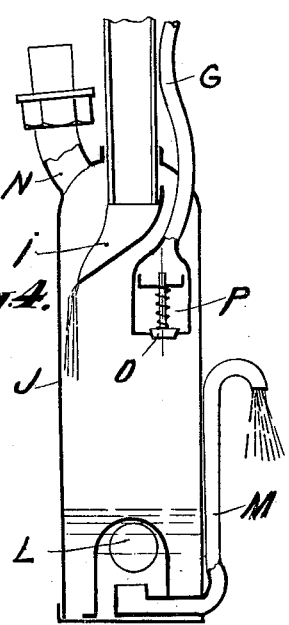
Figure 5:
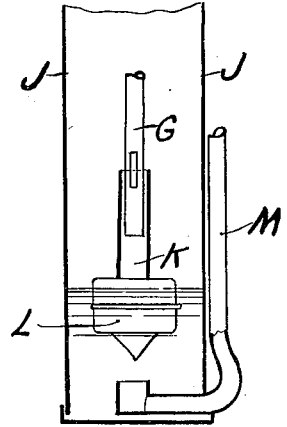

Fig. 1 shows in section an automatic exhaust-distributer with a float-distributer fitted with a valve. Fig. 2 shows the ejector, illustrating the special strength of the water-jet which should be obtained. Fig. 3 shows the arrangement of the ejector and of the divergent or extension forming the pump-body. Fig. 4 shows the lower part of the exhauster with a distributing-float with drawer or valve. Fig. 5 shows the water-chamber of the exhauster with a float and an automatic clack-valve for distribution.

In Fig. 1, A represents the cock or valve for the admission of the water; B, the wire-gauze filter; C, the water-discharge nozzle; D, the gas chamber or reservoir; E, the gas-suction pipe; F, the divergent or extension or pump-body; G, the conduit and pipe for the return of the compressed gas; H, the pipe conducting the gas compressed by the water-piston into the lower chamber of the exhauster; I, chute or conduit for the water; J, water-chamber of the exhauster; K, conical valve for the return of the gas; L, float guided by two stirrups or straps; M, outflow-pipe for the water; N, outgo junction or union for the compressed gas for feeding or supplying the gas-burners.

In Figs. 2, 3, 4, and 5 like letters indicate corresponding parts.

In order to insure the efficient operation of the hereinafter-described exhauster, it is necessary that the ejector C, Fig. 2, should produce a very homogeneous or solid cone of water and not a cone of sprayed water, but a conical sheet of water well maintained having the shape shown in the figure. It is very clear that by cutting this sheet of water on a plane situated more or less in proximity to the orifice different results will be obtained. If the cone of water be taken on a section of a large diameter, a large quantity of gas will be forced back at a low pressure. On the contrary, upon a small diameter a lesser quantity will be forced back, but at a higher pressure. These considerations are sufficient for guiding the choice of the diameter of the divergent or extension, which should be placed below Fig. 3 and the conical form of which should be in exact accordance with the outer portion of the cone of water.

The operation of the apparatus is extremely simple. It is sufficient to open the cock or valve A, when the water, after having passed through the filter, will enter the ejector C and issue out, as we have already mentioned, in the form of a conical piston. This piston will drive the gas before it into the divergent or extension F, and a suction will be thus produced in the box D and the gas will flow out through the pipe E, the water and the gas descending at the same time through the pipe H and arriving in the water-chamber J, where they will become separated, the gas escaping through the junction or union N and passing to the gas-burner. In accordance with the greater or less strength of the water-pressure the gas will be delivered at a greater or less pressure. To maintain an equal pressure of gas if the pressure of the water should be lessened, the size of the stream may be increased. The water-level in the chamber J beneath the orifice of the pipe M will fall to an extent corresponding to that which corresponds to the pressure of the gas passing out through the aperture N. It is here that the operation of the safety-valve K and of the float L come into play. It will be understood that if the gas were to stop flowing through the outgo-junction N, either because the gas-burners were turned off or from any other cause, the water continuing to run, the pressure in the box J would continually increase. The water-level would then likewise fall until it reached the orifice of the pipe M and the gas would escape into the atmosphere. Thanks, however, to the float, this latter inconvenience is obviated. When the water has fallen sufficiently low, the float L, as well as the valve $k$, will also descend, and the gas will ascend through the pipe G into the suction box or chamber, the pressure cannot again increase, and there will be no longer any fear of losing any gas.

In Fig. 5 we have shown a modified form of our apparatus wherein the float L is surmounted by a guide-tube K, telescoping upon the pipe G and operating to open or close an aperture in this latter in the same manner as a slide-valve. The float L might also be arranged to open a cock or valve or any equivalent device, the object of the operation of this apparatus being to prevent the pressure, and consequently the water-level, from depassing a certain predetermined limit by causing the compressed gas to return into the suction chamber or box.

The float L (shown in Fig. 5) has likewise another function. It terminates at its lower extremity in a cone-piece which, when the water has all escaped, descends upon and closes the orifice of the water-escape pipe M. This arrangement only comes into operation in the event of there being no water in the apparatus on account of its having been stopped working for a long period or from any other cause.

The modification illustrated in Fig. 4 is utilized in a case where it is impossible to employ a large water-chamber. The spherical float L is only intended to close the pipe M in the event of there being no water in the reservoir, and the pipe C is provided at its lower end with a valve-box P, fitted with valve O, kept in place by a suitable spring. The pressure is regulated by the tension of this spring, which allows the valve to lift when the said pressure rises too high and permits the gas to pass from the chamber J through the pipe G into the gas-chamber D, Fig. 1. If the valve-box P and the pipe G were not employed, the float L would be sufficient to prevent any loss of gas by its escaping into the atmosphere, but a regular pressure could not be maintained.

The above description shows that the exhauster affords every security. It may be employed in the socles of candelabra in order to raise the pressure of the gas and cause intensive burners to operate under more favorable conditions, or, again, in dwelling-houses for the same purpose or even for ordinary burners, in the industries for blowpipes for soldering or melting metals, and, in fact, wherever a fluid under pressure is required, the automatic exhaust-distributer raising the pressure of the gas or supplying air under pressure, as may be desired.

Having fully described our invention, what we claim, and desire to secure by Letters Patent, is—

1. In an automatic pressure-regulator for distributing gas, the combination with a compression-chamber, of means for introducing gas at normal pressure into said chamber, a water-inlet thereto for introducing water under pressure, an outlet-tube for water and entrained gas leading from said chamber, a separating-chamber connected with said tube, outlets from said separating-chamber for gas and water, respectively, an auxiliary gas-outlet consisting of a tube leading from the separating-chamber to the compressing-chamber, a valve normally closing the auxiliary gas-outlet, and means whereby said valve opens the auxiliary outlet when the water in the separating-chamber falls below a certain level, substantially as set forth.

2. In an automatic pressure-regulator for distributing gas, the combination with a compression-chamber, of means for introducing gas under normal pressure into said chamber, a water-inlet thereto for introducing water under pressure, an outlet-tube for water and entrained gas leading from said chamber, a separating-chamber connected with said tube, outlets from said separating-chamber for gas and water respectively, an auxiliary gas-outlet consisting of a tube leading from the separating-chamber to the compression-chamber, valves normally closing the auxiliary gas-outlet and normally opening the water-outlet and means whereby, when the water in the separating-chamber falls below a certain level, the positions of said valves are reversed, substantially as set forth.

3. In an automatic pressure-regulator for distributing gas, the combination of a chamber, means for introducing gas at normal pressure into said chamber, a tapering nozzle in said chamber adapted to introduce a diverging stream of water, an outlet-tube leading from said chamber and having its mouth located a short distance from the point of said nozzle, said mouth and tube being of a size and shape corresponding to the size and shape of the stream of which passes through them from said nozzle, a separating-chamber into which said outlet-tube leads, an outlet in the top of said chamber for the escape of gas, an outlet in the bottom for the escape of water, an auxiliary outlet for the escape of gas consisting of a tube leading back to the firstmentioned chamber, extending nearly to the normal surface of the water in said separating-chamber and provided at that end with a slot in its side, and a valve consisting of a float adapted to rise and fall with the surface of the water, provided with a tube arranged opposite the end of said auxiliary outlet-tube, telescoping the same so as to cover the said slot at the normal height of the water, said float also being provided with a projection adapted to fit into and close the aforesaid water-outlet, when the water is exhausted, substantially as set forth.

In testimony whereof we have affixed our signatures in presence of two witnesses.

AUGUSTE LECOMTE.
ISIDORE LOESER.

Witnesses:
EDWARD P. MACLEAN,
GEORGE E. LIGHT.